US012662402B2

(12) United States Patent
Safarzadeh-Amiri et al.

(10) Patent No.: US 12,662,402 B2
(45) Date of Patent: *Jun. 23, 2026

(54) CREATION OF AN IRON PRODUCT FOR WASTEWATER TREATMENT

(71) Applicant: U.S. PEROXIDE, LLC., Atlanta, GA (US)

(72) Inventors: Ali Safarzadeh-Amiri, Ontario (CA); Zachary Bryan Scott, San Diego, CA (US); John Ray Walton, Colfax, CA (US); Vladimir Djukanovic, Glen Allen, VA (US)

(73) Assignee: U.S. PEROXIDE, LLC., Atlanta, GA (US)

( * ) Notice: Subject to any disclaimer, the term of this patent is extended or adjusted under 35 U.S.C. 154(b) by 650 days.

This patent is subject to a terminal disclaimer.

(21) Appl. No.: 17/959,737

(22) Filed: Oct. 4, 2022

(65) Prior Publication Data

US 2023/0042185 A1 Feb. 9, 2023

Related U.S. Application Data

(63) Continuation-in-part of application No. 17/252,693, filed as application No. PCT/IB2019/000868 on Jul. 3, 2019, now Pat. No. 11,851,346.

(60) Provisional application No. 62/693,747, filed on Jul. 3, 2018.

(51) Int. Cl.

| | |
|---|---|
| ***C02F 1/52*** | (2023.01) |
| ***C01G 49/02*** | (2006.01) |
| *C02F 101/10* | (2006.01) |

(52) U.S. Cl.

CPC ............ *C02F 1/5245* (2013.01); *C01G 49/02* (2013.01); *C02F 2101/101* (2013.01); *C02F 2303/02* (2013.01)

(58) Field of Classification Search

None

See application file for complete search history.

(56) References Cited

U.S. PATENT DOCUMENTS

| | | | |
|---|---|---|---|
| 4,312,760 | A | 1/1982 | Neville |
| 4,830,838 | A | 5/1989 | Kent et al. |
| 5,122,279 | A | 6/1992 | Guess |
| 5,141,647 | A | 8/1992 | Bhadra |
| 5,948,269 | A | 9/1999 | Stone |
| 6,319,412 | B1 | 11/2001 | Reyna |

FOREIGN PATENT DOCUMENTS

| | | | | | |
|---|---|---|---|---|---|
| CN | 1134407 | | * | 1/2004 | |
| CN | 101671068 | | * | 7/2010 | |
| CN | 104944480 | A | | 9/2015 | |
| CN | 105585050 | | * | 5/2016 | |
| CN | 105731548 | | * | 7/2016 | |
| CN | 106698821 | A | | 5/2017 | |
| CN | 107126960 | | * | 9/2017 | |
| EP | 1318103 | A2 | * | 6/2003 | ............. B09C 1/002 |
| EP | 1318103 | | * | 3/2022 | |
| JP | H101315 | | * | 1/1998 | |
| JP | 2008100849 | | * | 10/2006 | |
| WO | 2010/0115871 | A1 | | 10/2010 | |
| WO | 2017/170604 | A1 | | 10/2017 | |

OTHER PUBLICATIONS

Jan. 5, 2021 International Preliminary Report on Patentability issued in International Patent Application No. PCT/IB2019/000868.
Jan. 31, 2023 Office Action issued in U.S. Appl. No. 17/252,693.
Cambridge Dictionary. "Slurry". https://dictionary.cambridge.org/us/dictionary/english/slurry (Year: 2023).
Jul. 14, 2023 Office Action Issued In U.S. Appl. No. 17/252,693.

* cited by examiner

*Primary Examiner* — Sheng H Davis
(74) *Attorney, Agent, or Firm* — Oliff PLC

(57) ABSTRACT

An embodiment provides a method for making a non-hazardous iron product for treating wastewater, including: adding sodium bisulfite to a solution comprising iron, creating an aqueous solution; adding an amount of sodium hydroxide to the aqueous solution to increase the pH of the aqueous solution to between 2-2.5; determining an amount of sodium bicarbonate and adding the identified amount of sodium bicarbonate to the aqueous solution, wherein the sodium bicarbonate adjusts the pH of the aqueous solution to a desired pH; and providing a buffer to the aqueous solution to generate a slurry. Other embodiments are described and claimed.

18 Claims, 4 Drawing Sheets

CREATION OF AN IRON PRODUCT FOR WASTEWATER TREATMENT

CROSS-REFERENCE TO RELATED APPLICATIONS

This application is a continuation-in-part of U.S. application Ser. No. 17/252,693, which is a U.S. national stage application of PCT Application No. PCT/IB19/00868, filed on Jul. 3, 2019, and claims the earlier filing date benefit of U.S. Provisional Application No. 62/693,747 filed on Jul. 3, 2018, entitled "CREATION OF AN IRON PRODUCT FOR WASTEWATER TREATMENT." These applications are incorporated by reference herein in their entireties.

BACKGROUND

The treatment of wastewater is important for many different industries in order to reduce the risk posed by the wastewater. Thus, many municipalities, industrial plants, and the like, have wastewater treatment facilities. One component of wastewater that has unpleasant side effects is hydrogen sulfide. Sulfides in wastewater produce an unpleasant odor, may lead to the corrosion of fluid conveyance devices (e.g., pipes, tubing, pumps, etc.), and are toxic to both humans and wildlife. Though it is desirable to control the sulfides in the wastewater this may be difficult and troublesome for some municipalities and facilities.

BRIEF SUMMARY

One embodiment provides a method for making a non-hazardous iron product for treating wastewater, comprising: adding sodium bisulfite to a solution comprising iron, creating an aqueous solution; adding an amount of sodium hydroxide to the aqueous solution to increase the pH of the aqueous solution to between 2-2.5; determining an amount of sodium bicarbonate and adding the identified amount of sodium bicarbonate to the aqueous solution, wherein the sodium bicarbonate adjusts the pH of the aqueous solution to a desired pH; and providing a buffer to the aqueous solution to generate a slurry.

Another embodiment provides a method for making a non-hazardous iron product for treating wastewater, comprising: adding sodium bisulfite to an iron starting material solution creating an aqueous solution; determining an amount of sodium hydroxide and adding the identified amount of sodium hydroxide to the aqueous solution, wherein the sodium hydroxide adjusts the pH of the aqueous solution to between 4-4.5; and providing a buffer to the aqueous solution to generate a slurry.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
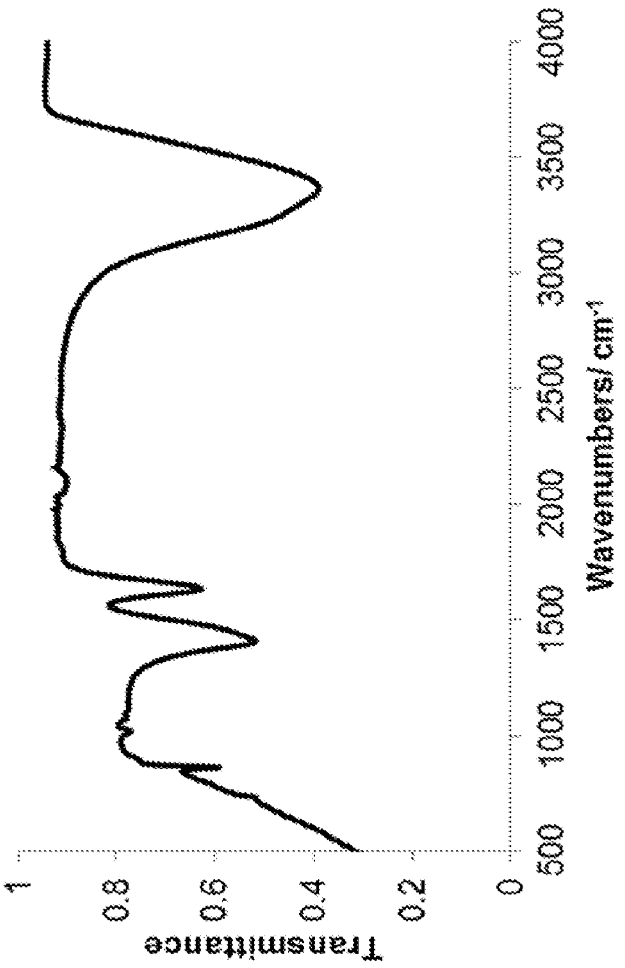
FIG. 1 shows an infrared spectrum of a slurry of an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The need to control sulfide-induced odors and corrosion in wastewater collection systems is necessary, with municipal water agencies spending $100-200 million per year in North America alone. Iron salt solutions have been used for over 50 years to control sulfide in wastewater collection systems, as well in wastewater treatment plants, and may be the most cost-efficient method available. However, iron salt solutions are regulated hazardous materials due to their corrosive nature and environmental damage in the event of accidental release. Consequently, the use of iron salt solutions is generally restricted to large trunklines that pass through industrial zones that can accommodate the intrusive facilities needed for frequent bulk chemical deliveries, and where the cost savings justify the associated capital outlay to mitigate the risk.

Thus, there exists a need to control sulfide in smaller upstream tributary segments as well. These smaller upstream tributary segments are more likely to be located in residential communities and commercial districts where storage of hazardous materials is highly regulated and often forbidden. Thus, the use of iron salt solutions in these tributary segments is difficult, if not impossible. As a result, more expensive, low-hazard chemicals are the only option for uses in these tributary lines. This leaves few, if any, alternatives for protecting wastewater infrastructure and controlling nuisance odors in these communities.

One such alternative is oxygen injection, while practical for pressurized force mains, is not suitable for unpressurized gravity mains often found in residential locations. Further, oxygen may be quickly consumed within the sewer system and so must be re-applied repeatedly downstream, greatly complicating its deployment and increasing its cost. A second alternative is a nitrate solution, which requires biological uptake (for example, through the use of biofilms adhered to the pipe walls) to affect sulfide removal. Such a solution may take several hours to remove hydrogen sulfide. Additionally, the effective cost of controlling sulfide with nitrate is several times that of controlling sulfide with iron solutions. A third alternative is the use of alkali solutions, such as slurries of magnesium or calcium hydroxide to control $H_2S$ by raising the pH of the wastewater so most of the sulfide remains in the liquid, and less is volatilized into the vapor. Inevitably, the wastewater pH is lowered as flows intermingle and the alkali is diluted, thereby volatilizing the $H_2S$ and producing the undesirable odors. Additionally, this method may corrode infrastructure and be less safe for workers. Further, the sulfide that remains in the liquid can impede treatment plant processes such as clarification, biological treatment, and phosphorus removal. What is needed is a cost-effective way to control $H_2S$ in wastewater collection lines located in residential communities and commercial zones that does not require intrusive, hazardous chemical storage/dosing facilities.

Accordingly, an embodiment provides a stable, non-hazardous iron product, for example, consisting primarily of $Fe^{2+}$ and $Fe(OH)_2$ that is produced with little or no alkali hydroxides (NaOH or KOH). An embodiment may use a predominantly concentrated solution of sodium hydroxide and solid (dry) sodium carbonate and/or bicarbonate mixed with the iron solution to assist in minimizing $CO_2$ gas production. A soda ash, for example, solid alkalis of $Na_2CO_3$ and/or $NaHCO_3$, or the like, may be added to the iron solution. The soda ash may encourage the production of microcrystalline iron products that may disrupt the formation of polymeric $Fe(OH)_2$ species and is used to partially neutralize the free acid. Thus, the described solution and method for preparing the solution provides a non-hazardous solution that is of a reduced cost as compared with other solutions and that assists in neutralizing and eliminating sulfide in wastewater. Additionally, the describe solution may reduce storage, pumping, and performance issues associated with other methods.

Composition of Matter

In an embodiment, a slurry (referred to as $Fe(OH)_2$/$Na_2CO_3$ slurry as well) of a non-hazardous iron product is prepared. For example, the solution may include ferrous carbonate, ferrous hydroxide, or the like. The slurry may have a pH greater than, or equal to, pH 4, making it slightly acidic and non-corrosive iron product. For example, the pH of the solution may be in the range of 4.0 to 5.0, and may specifically be between 4.0 and 4.5. The Fe (iron) content of the iron product slurry may be greater than 5%, 10%, and may be even close to 15% by weight, which may result in the most effective neutralization of the sulfides. In an embodiment additives or preservatives may be included in the slurry, for example, anti-clumping agents (e.g., cationic organic polymers) which may retard agglomeration into larger particles, thickening agents (e.g., guar gum) that may retard settling of particulates reducing need for mechanical disruption, oxygen scavengers (e.g., sodium bisulfite) that may retard air oxidation of $Fe^{2+}$ into $Fe^{3+}$, and the like. These preservatives/additives may assist in making a shelf-stable product that will maintain the slurry integrity for an extended period of time.

Method of Production

To prepare the described slurry, a user or system may add different components into the solution. The addition of the components may be performed in a specific order to create the slurry in a safe manner. However, the components may be added in any order when the proper safety precautions are undertaken. In particular, the sodium bisulfite can be added at any stage of the production, or not added at all. As a merely illustrative example, amounts and ratios of reagents used in the production of the non-hazardous iron product slurry are specified in Table 1 below. To safely produce the slurry, the order of addition may be as follows: sodium bisulfite is added to a starting iron starting material solution, followed by the addition of caustic soda (if used), and then the soda ash. For example, referring to Table 1, the order may be that the sodium bisulfite is added to the starting $FeCl_2$ solution, the sodium hydroxide is then added and mixed to dissolve as much of the solid $Fe(OH)_2$ formed as possible, and then the carbonate is added and dissolved/dispersed with continued mixing.

TABLE 1

| Reagent | Volume or weight |
|---|---|
| Ferrous iron (30% $FeCl_2$ solution) | 1 L |
| Sodium bisulfite (40% $NaHSO_3$ solution)(preserve) | 1 g |
| Caustic soda (35% NaOH solution) | 8-80 mL |
| [Sodium Carbonate]/[Iron] mole ratio | 0.15 to 0.5 |

In an embodiment, the Fe(II) (ferrous iron) starting material may be a $FeCl_2$ or $FeSO_4$ solution, which may or may not contain a few percent of the corresponding ferric iron. In other words, the iron starting material may be an off-the-shelf product and may have variances in a percentage of corresponding ferric iron or even the concentration of the iron solution. In an embodiment, higher concentration iron solutions may be used to produce higher concentrations of non-hazardous iron products. This may reduce transport and storage costs. For example, starting $FeCl_2$ solutions may be greater than 20% by weight or greater than 30% by weight. In an embodiment the Fe(II) concentration in the starting material may be below its solubility limit to about 15%.

In an embodiment, alkalis may be added to the $FeCl_2$ or other iron starting material solution. The alkalis may include or contain sodium bisulfite. For example, if the initial pH of the iron starting material solution is less than 1 or less than 0.8, for example, a non-$CO_2$ emitting alkali, such as NaOH or other non-carbonate base, may be added to raise the pH of the iron starting material solution to a second higher pH (e.g., raising the solution from a first pH of about pH≤0.0-0.5 to a second pH of from 0.8 to 2, or from 0.8 to 1.2, or about 1), thereby partially neutralizing the free acid of the iron starting material solution. Next, sodium carbonate or bicarbonate may be added to raise the pH to a third, higher pH (e.g, a pH of from 3 to 5 or from 3.5 to 4.5), which is typically the final desired pH of the non-hazardous iron product. The bisulfite can be added to the solution at any stage, including before, after, or during the addition of the non-$CO_2$ emitting alkali. The carbonate or bicarbonate can be added, for example, in powder or other solid form, and may be added in an amount that may vary from 0.15 to 0.5 mole ratio of carbonate to iron. The amount of sodium carbonate or bicarbonate added depends on a final desired pH of the non-hazardous iron product and the amount of NaOH added to, and the pH/acidity of, the precursor Fe(II) solution. The purpose of the NaOH addition, or other non-$CO_2$ emitting alkali, at a low pH value is to partially neutralize the free acid content and minimize $CO_2$ generation which could otherwise produce significant $CO_2$ gas upon addition of the carbonate in the next step. Accordingly, in another aspect, if the initial pH of the iron starting material solution is determined to be greater than 0.8 or greater than 1, for example, it may not be necessary or desirable to add a non-$CO_2$ emitting alkali, and instead the pH can be raised to a desired pH (e.g., 3 to 5, or 3.5 to 4.5) by the addition of carbonate or bicarbonate. Here also, the bisulfite can be added at any stage of the process. Additionally or alternatively, $Na_2CO_3$ or $NaHCO_3$ may be used to neutralize the free acid, in which case the off-gassed $CO_2$ may be captured in a caustic scrubber. In an embodiment, the scrubber solution containing NaOH and/or $Na_2CO_3$ may then be added to the precursor $FeCl_2$ solution to neutralize all or a portion of the free acidity, which may create a $CO_2$ recovery or reuse loop. In an embodiment, the $Na_2CO_3$ may be added slowly to the low-acid $FeCl_2$ precursor as a dry powder while undergoing rapid mixing.

In an embodiment, the temperature of the reaction through alkali addition(s) may be near ambient temperature. The pressure may be generally atmospheric. Alternatively, a mild pressure (up to 150 psig) may be applied to the reactor. The mild pressure may minimize $CO_2$ off-gassing. The reactor solution may be mixed continuously at a moderate speed during the addition of hydroxide and carbonate. The reaction time may depend on the dispersion and/or dissolution of carbonate. The reaction time may depend on the starting $FeCl_2$ solution. For example, the reaction time may be 4-12 hours.

In an embodiment, a method of production may produce a high concentration non-hazardous slurry iron product. In an embodiment very little or no free water may be added in the process. For example, if starting with a 30% $FeCl_2$ solution (13.2% Fe by weight) a non-hazardous iron product of approximately 12% Fe may be produced.

Product Aging

In an embodiment, the initial product(s) formed may undergo further aging. For example the aging may be accomplished over a few hours. The aging may generate a bluish/green micro-slurry that may remain suspended.

Storage Stability/Preservation

In an embodiment, the unpreserved homogenous non-hazardous iron products may exhibit deterioration through normal storage conditions. For example, deterioration may be determined by: 1) changes in ferrous/ferric ratio (at ambient temperatures) and/or 2) reduced end-use performance (e.g., diminished efficiency at binding sulfide). Dispersants, anti-oxidants, or anti-clumping agents may be added to improve product storage stability and end-use performance, in which case the product is stable for at least a month without noticeable loss of sulfide binding efficiency.

Product Compositions

Product compositions may vary. Example preparations are illustrative and not meant to be limiting. In a first example, preparation of $Fe(OH)_2/Na_2CO_3$ slurry may contain: (High-acidity) Fe(II) Solution (30% $FeCl_2$; 6% free acid): 1 L, Sodium bisulfite ($NaHSO_3$): 1.0 g, Sodium hydroxide (NaOH): ≥60 mL of 35% NaOH solution (equivalent of about 27 g NaOH), Sodium carbonate ($Na_2CO_3$): ≤213.5 g.

In an embodiment, the preparation of $Fe(OH)_2/Na_2CO_3$ slurry may use the following process: While mixing the $FeCl_2$ starting solution at moderate speed, add sodium bisulfite, add NaOH solution to bring solution pH to about 1.5-2.0, continue mixing to dissolve as much of $Fe(OH)_2$ solid formed as possible, then add sodium carbonate slowly to bring the solution to about pH 4.0-4.5, and continue mixing until the carbonate is dissolved and or dispersed. The addition of carbonate may generate $CO_2$ gas, estimated to be less than 7 volumes gas per volume liquid. The $CO_2$ volume can be reduced to less than 1 L using a higher concentration of NaOH. The mixture may become gelatinous after the addition and dissolution/dispersion of carbonate, but may convert to a blue-tinted slurry within hours of mixing, provided that carbonate is added at once.

FIG. 1 illustrates an illustrative infrared (IR) spectrum of the first slurry. In an embodiment, the dominant feature of the spectrum is hydroxyl absorption band centered around 3400 $cm^1$, and there are no indications of the presence of $FeCO_3$ or $FeCO_3 \cdot Fe(OH)_2$. $Fe(OH)_2$ is the dominant species present in the slurry.

In a second example of product preparation of $Fe(OH)_2/Na_2CO_3$ slurry the following method may be used: Two different slurries may be prepared and used to sequester sulfide in raw sewer water or other wastewater. The amount of NaOH and sodium carbonate ($Na_2CO_3$) used for preparation of slurries (scale-up to 1 L) are presented in Table 2. Also presented in Table 2 is the slurry pH measured two to six days after preparation. The procedures for preparation of slurries may be as follows. Add approximately 1 L of Fe(II) solution (high-acidity) to a beaker, drop a stirring bar in the beaker and place it on a stirring plate, and mix the solution at a moderate speed. Add sodium bisulfite followed by the addition of NaOH while mixing to ensure that most, if not all, of $Fe(OH)_2$ precipitates formed is dissolved; then add $Na_2CO_3$ slowly and continued mixing until gas evolution stops. Example preparations are illustrative and not meant to be limiting.

TABLE 2

| Chemicals | 35% NaOH/ mL(g) | $Na_2CO_3$/g | [Fe]/[$Na_2CO_3$] Molar | $NaHSO_3$/g | pH |
|---|---|---|---|---|---|
| Slurry #1 | 50 (22.6) | 214 | 0.6 | 1.0 | 4.9 |
| Slurry #2 | 80 (36) | 178 | 0.5 | 1.0 | 4.8 |

In a third example of product preparation, homogeneous $Fe(OH)_2$/Carbonate may be produced. In an embodiment, a homogeneous $Fe(OH)_2$/Carbonate may be prepared using fresh, low-acidity Fe(II) solution, which may be used to sequester sulfide in raw sewer water or wastewater. The concentrations of reagents used for preparation of slurries (scale-up to 1 L) are presented in Table 3 along with the solution pH. Also presented in Table 3 is the slurry pH measured two to six days after preparation. The procedures for preparation of slurries may be as follows: Add approximately 900 mL of Fe(II) solution to a beaker, add 100 mL of water, drop a stirring bar in the beaker and place it on a stirring plate, and mix the solution at a moderate speed; weigh sodium carbonate and sodium bisulfite, mix, and slowly add the carbonate/bisulfite mixture and continue mixing until gas evolution stops.

TABLE 3

| Parameters | Low acidity Iron Solution | Water | $Na_2CO_3$/ g | [Fe]/ [$Na_2CO_3$] | $NaHSO_3$/ g | pH |
|---|---|---|---|---|---|---|
| Amount | 0.9 L | 0.1 L | 371 | 0.9 | 1.0 | 4.0 |

The addition of carbonate to an aged low-acidity Fe(II) solution generates slurry. The compositions of an aged slurry is presented in Table 4.

TABLE 4

| Param-eters | Iron Solution | NaOH (35%) | $Na_2CO_3$/g | [Fe]/[$Na_2CO_3$] | $NaHSO_3$/g | pH |
|---|---|---|---|---|---|---|
| Amount | 1 L | 8-10 mL | 2.5-5.0 | 0.125-0.25 | 1.0 | 4.3 |

Storage Stability Test Results

Figure 2:
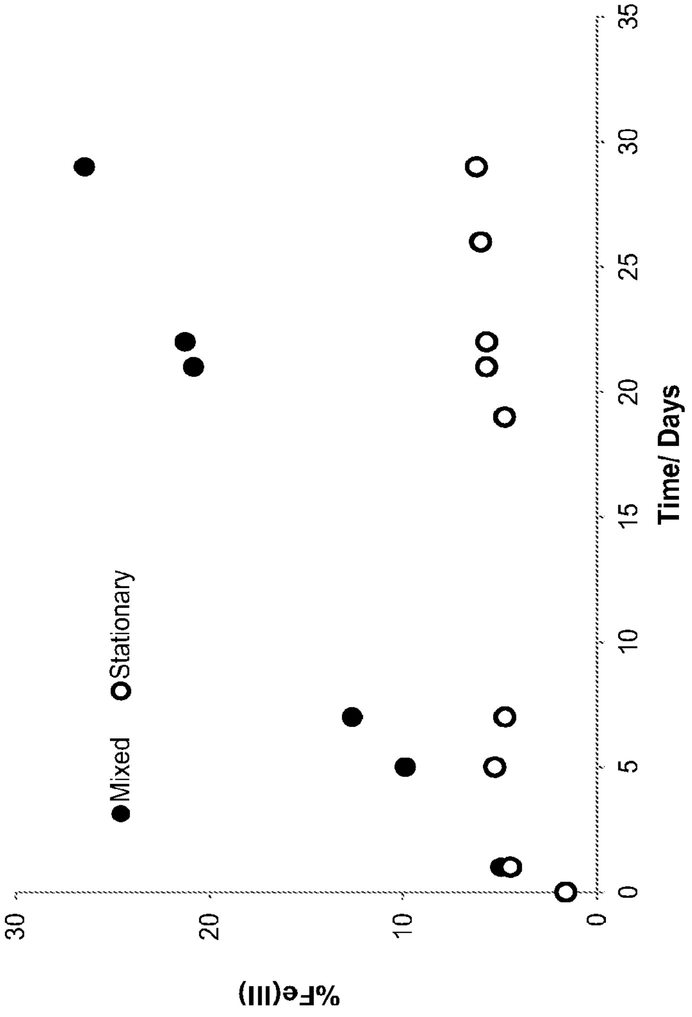
FIG. 2 illustrates a rate of formation of ferric iron over time of an embodiment.

As an example, the slurry prepared using per Table 2 was divided into two portions. One portion was mixed vigorously and continuously and the other portion was at rest; these solutions were analyzed for Fe(II) and Fe(III) concentrations and the results are presented in FIG. 2. The fraction of Fe(III) may increase and reach about 28% after about a month in the solution that is mixed vigorously and continuously, in contrast the fraction of Fe(III) in solution that was not mixed may only increase to about 6%. In an embodiment, the stability of soluble $Fe(OH)_2$ prepared using low acidity Fe(II) solution may be stable for at least a month, with $Fe^{3+}$ possibly representing 2-3% of the total Fe concentration in the product providing the solution is not disturbed.

End-Use Performance Test Results

Lab Tests #1

In an embodiment, the slurry may exhibit the following illustrative end-use test results. Raw wastewater was collected from a local wastewater treatment plant and added to a glass container (total volume ~4.6 L) that was fitted with a valve, capped, and placed on a stirring plate, mixed gently, and allowed to incubate/ferment for two to four days in an almost anaerobic environment (a small air pocket may form on the top after a couple of days of incubation). This fermented wastewater generated sulfide; the concentration of sulfide generated increases with concentrations of dissolved and suspended organics and the duration of fermentation. For example, the total sulfide generated after two and three days in the above wastewater being about 2.5 mg/L and 6.2 mg/L, respectively. The solution was spiked with $HS^-$ to increase the concentration of free sulfide and then sequestered by employing either Fe(II) solution or slurry Fe(II).

Sulfide can be sequestered by both ferrous and ferric iron. For example, under ideal conditions one mole of ferrous ion or ferrous hydroxide may react with one mole of hydrogen sulfide and may form one mole of insoluble ferrous sulfide (FeS), while 1.5 on moles of sulfide may react with one mole of ferric ion or ferric hydroxide, according to the following reactions:

$$Fe(II)/Fe(OH)_2 + H_2S \rightarrow FeS + 2\ H^+/2H_2O$$

$$Fe(OH)_3 + H_2S \rightarrow FeS + 1/2\ S + 3\ H_2O$$

In an embodiment, the maximum efficiency of removal of sulfide by ferrous and ferric ion and under ideal conditions, according to the above equation, may be 1 and 1.5, respectively. The above stoichiometry may not be predictive of iron product requirements because iron dissolution and reaction kinetics may be important and chemical equilibrium may not ever occur, as especially affected by the net pH of the reagent and wastewater (Kiilerich, et al., 2017).

For example, two tests were performed to determine the efficiency of sequestration of sulfide by both the slurry-Fe prepared as per Table 2 and Fe(II). The testing procedure was the same as that reported by Nielsen et al (Water Environ. Fed., 2008). The results of the first two tests are presented in Table 5. The data presented are the average of four replicate tests (using the same water).

TABLE 5

| Fe-Source | $[S^{2-}]_T$/mg/L | $[S^{2-}]_D$/mg/L | [Fe(II)]/mg/L | $[Fe]_T$/mg/L | Efficiency[1] | pH |
|---|---|---|---|---|---|---|
| High Acidity Fe(II) | 9.86 ± 0.17 | 4.15 ± 0.30 | 10.72 ± 0.37 | 11.35 ± 0.26 | 0.77 | 7.13 ± 0.01 |
| Slurry #1 | 10.26 ± 0.25 | 4.11 ± 0.30 | 10.08 ± 0.28 | 10.50 ± 0.38 | 0.88 | 7.24 ± 0.01 |

In an embodiment, the total concentration of sulfide prior to amendment with $HS^-$ was 2.2 mg/L and the total concentration of Fe was about 1.3. The data presented in Table 5 shows that: The pH of wastewater spiked with the Fe(II) product may be slightly less than that amended with non-hazardous slurry-Fe product. The concentrations of dissolved sulfide in wastewaters treated with slurry-Fe product may be similar to or higher than those treated with the Fe(II) product, while the concentration of Fe in the former is about 1 mg/L less than that in the latter. Thus, the wastewater was amended by about 1 mg/L less with the slurry-Fe product than the Fe(II) from $FeCl_2$ commodity product, yet provided equal or better sulfide control performance.

[1]Assuming that 1.0 mg/L iron dissolved in wastewater sequestered approximately 1.5 mg/L of sulfide Lab Test #2

As another example, a raw wastewater sample was collected from a local wastewater treatment plant and analyzed for various parameters. Example results are presented in Table 6. The concentrations of dissolved ($[S^{2-}]_D$) and total sulfide ($[S^{2-}]_T$) in raw wastewater were 0.017 mg/L and 0.137 mg/L, respectively. The pH of raw water was about 7.4 and decreased to about 6.9 with fermentation generation of hydrogen sulfide.

TABLE 6

| Parameters | pH | Fe(II)/mg/L | $Fe_T$/mg/L | Alkalinity/mg/L | COD/mg/L |
|---|---|---|---|---|---|
| Values | 7.4 | 0.6 | 1.04 | 297 ± 2.0 | 410 ± 10 |

As an example, raw wastewater was allowed to ferment for three days and the concentrations of dissolved and total sulfide in raw wastewater increased to about 10.6 mg/L and 12 mg/L, respectively. Again, two sets of tests were performed to determine the efficiency of sequestration of sulfide by both the $Fe(OH)_2$/Carbonate slurry, prepared as per Table 3, and Fe(II). The results of the first two tests are presented in Table 7. The data presented are average for different tests (using the same water). The results again show that the non-hazardous $Fe(OH)_2$/Carbonate product may perform better than the commodity Fe(II) product.

TABLE 7

| Fe-Source | $[S^{2-}]_T$/ mg/L | $[S^{2-}]_D$/ mg/L | [Fe(II)]/ mg/L | Efficiency[2] | pH |
|---|---|---|---|---|---|
| Low Acidity Fe(II) | 9.45 ± 0.15 | 3.42 ± 0.11 | 11.29 ± 0.56 | 0.77 | 7.14 ± 0.01 |
| $Fe(OH)_2/Na_2CO_3$ | 10.60 ± 0.25 | 2.611 ± 0.10 | 10.93 ± 0.35 | 0.98 | 7.10 ± 0.01 |

[2]Assuming that iron dissolved in wastewater sequestered approximately 1.15 mg/L of sulfide For example, the above tests were repeated several more times over a period of 30 days using the same $Fe(OH)_2$/ $Na2CO_3$ slurry prepared as per Table 3 and fresh raw wastewater from the same wastewater treatment plant. Example water quality data are shown in Table 8.

TABLE 8

| Parameters | pH | [Fe(II)]/ mg/L | $[Fe]_T$/ mg/L | Alkalinity/ mg/L | COD/ mg/L |
|---|---|---|---|---|---|
| Values | 7.60 ± 0.15 | 0.8 | 1.20 ± 0.22 | 310 ± 100 | 410 ± 70 |

Figure 3:
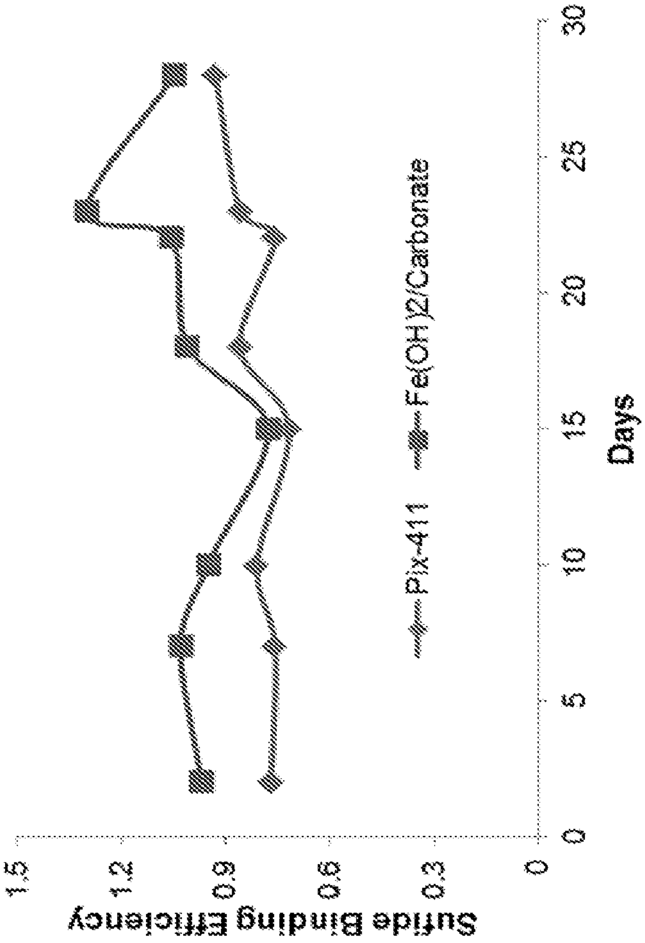
FIG. 3 illustrates sequestration of hydrogen sulfide in a wastewater using a slurry produced per an embodiment.

The concentrations of $S^{2-}{}_D$ and $S^{2-}{}_T$ in the fresh wastewater were about 0.01 mg/L and 0.17 mg/L on average, respectively; and increased, after three days of fermentation in an anaerobic environment, to about 11.7 mg/L and 10.8 mg/L, respectively. FIG. 3 compares the $H_2S$ sequestration efficiency with the low-acidity Fe(II) product and the non-hazardous $Fe(OH)_2$/carbonate slurry.

Lab Test No 3

Figure 4:
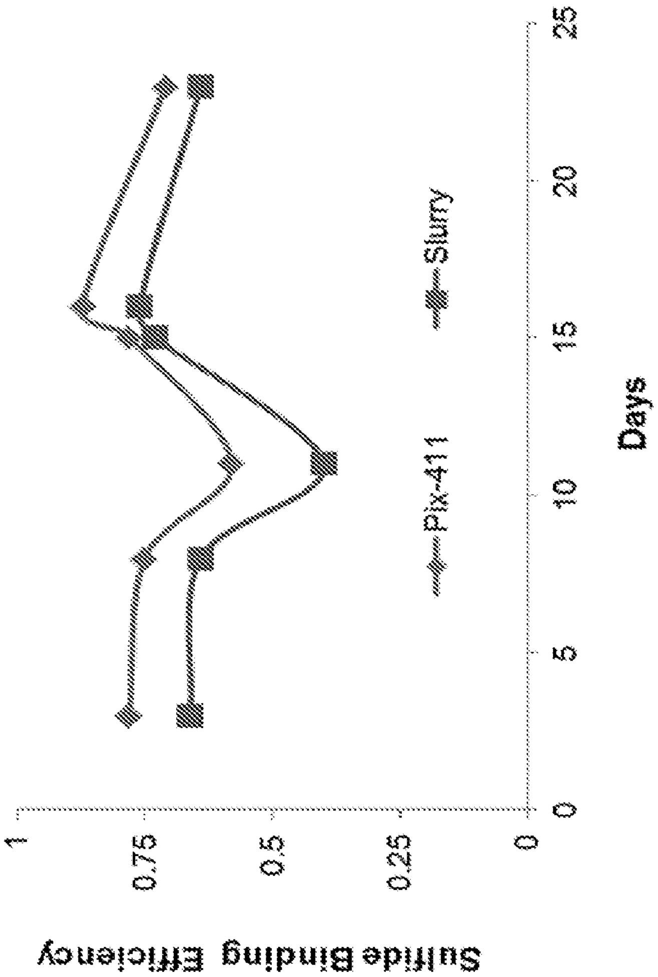
FIG. 4 illustrates sequestration of sulfide in a wastewater using another slurry produced per an embodiment.

In another example, raw wastewater was collected from the same wastewater treatment plant as before on different days, and allowed to ferment as described above. The concentration of total sulfide reached about 12-24 mg/L. The above sulfide sequestration tests were repeated using a commercial low-acidity and aged Fe(II) solution and a non-hazardous slurry prepared using the same low-acidity and aged Fe(II) solution, NaOH, and $Na_2CO_3$ (see Table 4). Example test results are shown in FIG. 4 which illustrates plots showing sulfide sequestration efficiencies by Fe(II) solution and a non-hazardous $Fe(OH)_2/Na_2CO_3$ slurry prepared using the Fe(II) solution. The data clearly show that the efficiency of the non-hazardous slurry for sulfide sequestration may be similar to or slightly less than that of commercial Fe(II) solution. These lab tests are merely presented as illustrations and are not intended to be limiting ratios, volumes, types, or the like, of any of the components used in generation of the slurry.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of making an iron product, the method comprising:

providing an aqueous solution comprising ferrous iron as at least one of ferrous chloride and ferrous sulfate, the aqueous solution comprising ferrous iron having a first pH; and adding carbonate or bicarbonate to the aqueous solution comprising ferrous iron to increase the pH of the aqueous solution to a desired pH to produce the iron product, wherein the iron product includes at least 5 weight % of iron content that consists primarily of $Fe^{2+}$ and $Fe(OH)_2$, and wherein the carbonate or bicarbonate is only added to the aqueous solution comprising ferrous iron when the aqueous solution has a pH of 0.8 or greater.

2. The method of claim 1, wherein the ferrous iron comprises ferrous chloride.

3. The method of claim 1, wherein the ferrous iron comprises ferrous sulfate.

4. The method of claim 1, wherein the first pH is less than 0.8.

5. The method of claim 1, wherein the desired pH is in a range of from 3 to 5.

6. The method of claim 1, wherein the desired pH is in a range of from 4 to 5.

7. The method of claim 1, wherein the iron product is an iron-containing slurry.

8. The method of claim 7, further comprising measuring an infrared spectrum of the slurry.

9. The method of claim 1, further comprising capturing carbon dioxide that is generated during the method of making the iron product using a caustic scrubber.

10. The method of claim 1, further comprising adding, to the aqueous solution, at least one additional agent from the group consisting of dispersants, anti-oxidants, and anti-clumping agents.

11. The method of claim 1, further comprising adding bisulfite to the aqueous solution.

12. The method of claim 1, further comprising adding a non-$CO_2$ emitting alkali to the aqueous solution to increase the pH of the aqueous solution from the first pH to a second pH that is intermediate the first pH and the desired pH.

13. The method of claim 12, wherein the non-$CO_2$ emitting alkali is sodium hydroxide.

14. A method of treating wastewater to sequester sulfides in the wastewater comprising contacting the wastewater with the slurry of claim 7.

15. A method of making an iron product, comprising:

providing an aqueous solution comprising iron and having a first pH; and adding a non-$CO_2$ emitting alkali to the aqueous solution to increase the pH of the aqueous solution from the first pH to a second pH that is in a range of from 0.8 to 2, adding carbonate or bicarbonate to the aqueous solution to increase the pH of the aqueous solution from the second pH to a desired pH, the second pH being intermediate the first pH and the desired pH.

16. The method of claim 15, wherein bisulfite is added to the aqueous solution before the non-$CO_2$ emitting alkali is added to the aqueous solution.

17. The method of claim 15, wherein bisulfite is added to the aqueous solution after the non-$CO_2$ emitting alkali is added to the aqueous solution.

18. The method of claim 15, wherein the non-$CO_2$ emitting alkali is sodium hydroxide.

* * * * *